United States Patent
Wu et al.

(10) Patent No.: US 9,383,793 B2
(45) Date of Patent: *Jul. 5, 2016

(54) SYSTEM AND METHOD FOR POWERING AN INFORMATION HANDLING SYSTEM THROUGH A DISPLAY CABLE

(71) Applicant: Dell Products L.P., Round Rock, TX (US)

(72) Inventors: Shuguang Wu, Austin, TX (US); Joseph E. Goodart, Austin, TX (US); Jeffrey Thelen, Round Rock, TX (US); Randall E. Juenger, Belton, TX (US); Samuel Nicklaus D'Alessio, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,005

(22) Filed: Jan. 8, 2015

(65) Prior Publication Data

US 2015/0127959 A1    May 7, 2015

Related U.S. Application Data

(63) Continuation of application No. 12/503,540, filed on Jul. 15, 2009, now Pat. No. 8,949,627.

(51) Int. Cl.
*G06F 1/26* (2006.01)
*G06F 1/32* (2006.01)
*G06F 3/14* (2006.01)

(52) U.S. Cl.
CPC .............. *G06F 1/266* (2013.01); *G06F 1/3265* (2013.01); *G06F 3/1454* (2013.01); *G09G 2330/02* (2013.01)

(58) Field of Classification Search
CPC ....................................................... G06F 1/266
See application file for complete search history.

(56) References Cited

U.S. PATENT DOCUMENTS

| | | | |
|---|---|---|---|
| 5,914,585 A | 6/1999 | Grabon | |
| 6,535,983 B1 | 3/2003 | McCormack et al. | |
| 6,790,094 B1 | 9/2004 | Bergmann et al. | |
| 6,946,817 B2 | 9/2005 | Fischer et al. | |
| 7,076,270 B2 | 7/2006 | Jaggers et al. | |
| 7,269,673 B2 | 9/2007 | Kim et al. | |
| 7,940,522 B2 | 5/2011 | Solomon et al. | |
| 2007/0106913 A1 | 5/2007 | Lewis et al. | |
| 2007/0206827 A1* | 9/2007 | Tupman | H04H 60/74 381/334 |
| 2008/0297112 A1 | 12/2008 | Cordes et al. | |

* cited by examiner

*Primary Examiner* — Kim Huynh
*Assistant Examiner* — Eric Chang
(74) *Attorney, Agent, or Firm* — Terrile, Cannatti, Chambers & Holland, LLP; Robert W. Holland

(57) ABSTRACT

A display provides power to an information handling system through a display cable. The display cable includes a power wire and an auxiliary channel. The display and information handling system communicate through the auxiliary channel to coordinate power transfer from the display to the information handling system, such as in the form of a trickle charge to a battery integrated in the information handling system.

19 Claims, 3 Drawing Sheets

SYSTEM AND METHOD FOR POWERING AN INFORMATION HANDLING SYSTEM THROUGH A DISPLAY CABLE

BACKGROUND OF THE INVENTION

1. Field of the Invention

The present invention relates in general to the field of information handling system power sources, and more particularly to a system and method for powering an information handling system through a display cable.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today's mobile society has shown a preference for portable information handling systems due to the convenience of such systems in use. A typical portable information handling system has an integrated display, integrated I/O devices and an internal power source that together make the system operable for normal use without any cables tied to fixed resources, such as external AC power sockets or peripheral display and I/O devices. Although not required for operation, some external devices improve the usability of portable information handling systems when used at a fixed location. One example is a cradle that accepts the portable information handling system and provides interfaces for peripheral display and I/O devices. Another example is that users can selectively interface devices to a portable information handling system using ports available at the housing of the portable information handling system. Often, users desire to have a relatively small portable information handling system due to the convenience of smaller size while having a large display available to view images from the portable information handling system. One interface that supports external displays for a portable information handling system is the DisplayPort standard interface. DisplayPort supports bidirectional communication between an information handling system and a display through an auxiliary channel so that setup and use of a display for a portable information handling system is more convenient for an end user.

One difficulty with portable information handling systems is that an internal battery power source has a limited charge to run the system. Often, the battery charge expires at inconvenient times, such as when the user has a portable information handling system providing presentation materials through an external projector. The user has to halt the presentation to find and plug in an external power adapter for the information handling system. Industry has made some limited efforts to provide power to and from information handling systems through external interfaces. One example is Power over Ethernet, which provides power through an Ethernet cable that also supports a network interface. DisplayPort includes a power pin (DP_PWR and DP_PWR_RETURN) for the purpose of powering branch devices of the display with power provided from a source device, such as an information handling system. For example, a branch device is a DisplayPort to VGA adapter that makes DisplayPort signals compatible with a VGA display. DP_PWR provides 3.3V with an over current protection threshold of 3 A at the source and 1.5 A at the sink so that total power available is 10 W at the source or 5 W at the sink. However, a DisplayPort compliant cable cannot have wires for DP_PWR so that no direct power path is established between a source and sink. One option used to provide power from a display to an information handling system is the Cinema Display available from Apple's Macbook, which bundles a power cable with a display cable. A similar but now abandoned proprietary connector from Apple combined a DVI, power and USB cable to provide power from an information handling system to a display. Nonstandard bundled cable solutions are not helpful unless an end user has a compatible nonstandard system.

SUMMARY OF THE INVENTION

Therefore a need has arisen for a system and method which provides power to charge an information handling system through a display cable.

In accordance with the present invention, a system and method are provided which substantially reduce the disadvantages and problems associated with previous methods and systems for providing power to charge an information handling system. Power transfer from a display to an information handling system through a display cable is confirmed by communication between the display and information handling system.

More specifically, an information handling system processes visual information with processing components powered from an integrated battery. A display couples with the information handling system through a display cable, such as a DisplayPort cable. A power manager of the information handling system communicates with a display power source to determine that the display has the capability of power transfer to the information handling system. For example, a DPCD command of the DisplayPort standard is communicated through an auxiliary channel of a DisplayPort cable. If the display power source acknowledges a power transfer capability, power transfer is initiated by the power manager as needed, such as to trickle charge a battery of the information handling system. A charge detector detects a display cable connection when the information handling system is powered down to support a battery trickle charge even if the display and information handling system are powered down.

The present invention provides a number of important technical advantages. One example of an important technical advantage is that an information handling system receives power from a display through a standard display cable. A handshake passed between the display and information handling system establishes the parameters for providing power to the information handling system so that voltage and amperage thresholds are met. The display cable operates normally when interfaced with an information handling system or display that is not equipped to have power provided to the information handling system. Although power provided across a display cable to an information handling system may not be adequate to support operation of the information handling system, a trickle charge applied to the battery of the information handling system maintains battery life for an extended period or, if the information handling system is powered down, gradually charges the battery to a full charge.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Charging an information handling system battery with power provided through a display cable allows a convenient usage model with prolonged battery life where portable information handling systems are often interfaced, such as an external display peripheral or projector. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
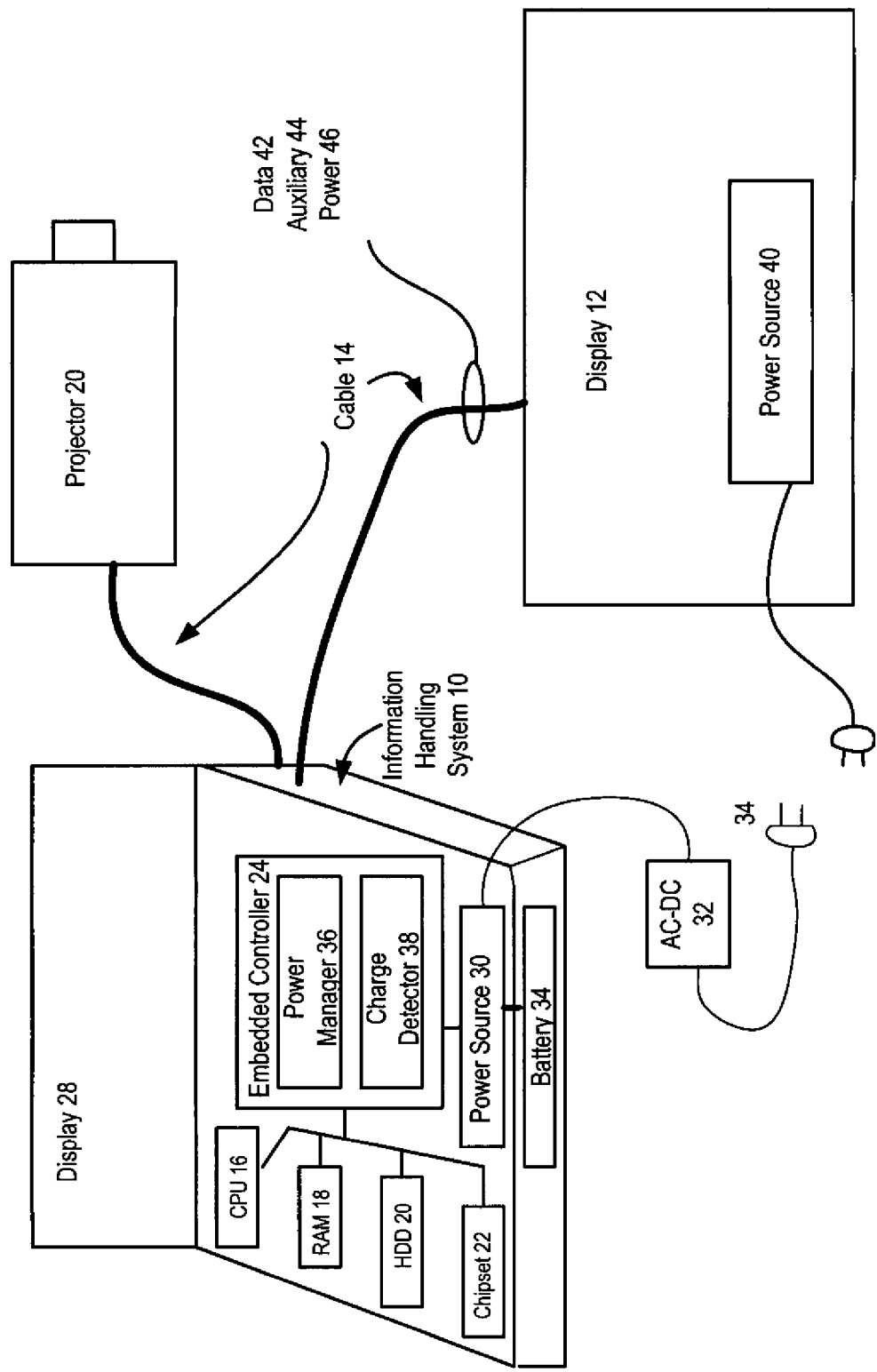
FIG. 1 depicts a block diagram of an information handling system having a power manager that charges a battery with power received from a display through a display cable.

Referring now to FIG. 1, a block diagram depicts an information handling system 10 having a power manager that charges a battery with power received from a display 12 through a display cable 14. Information handling system 10 processes information by the cooperation of plural processing components, such as a CPU 16, RAM 18, a hard disk drive 20, a chipset 22 and an embedded controller 24, also known as a keyboard controller. The processing components generate visual information for presentation as visual images at an external display 12, such as a peripheral LCD, a projector 26 or an integrated display 28. The processing components receive power to operate from a power source 30, which receives DC power from an AC-DC adapter 32 and AC power source 34, such as a wall socket. Power source 30 recharges battery 34 when external power is available and discharges battery 34 in the absence of external power so that the processing components have power to run. Embedded controller 24 includes a power manager, such as firmware instructions that operate even though other processing components are powered down. For example, instructions of power manager 24 manages charging of battery 34 by power source 30 when information handling system 10 is powered down. A charge detector 38 of power manager 36 detects when an external power source is available to charge battery 34, such as with ground detect or load sense circuits. Cable 14 is, for example, a DisplayPort cable having data, auxiliary and power wires wrapped in a common cable housing and coupling to a DisplayPort port of display 12 and information handling system 10. In one alternative embodiment, power manager 24 is firmware or software instructions stored in a medium, such as RAM 18, hard disk drive 20 or chipset 22, that executes on one or more processors, such as CPU 16 or a graphics processor disposed within chipset 22.

Display 12 has a power source 40 that provides power to present images at display 12 and also provides power for transfer to information handling system 10. Cable 14 includes plural wires that communicate between information handling system 10 and display 12, such as a data wire 42 that transfers visual information, a bi-directional auxiliary wire 44 that transfers management information and a power wire 46 that transfers power. Upon connection of information handling system 10 with display 12 through cable 14, power manager 36 issues a request to display power source 40 through auxiliary wire 44 to determine whether display 12 supports transfer of power to information handling system 10. If power transfer is not supported, information handling system 10 interacts with display 12 in a conventional manner. If power transfer is supported by display 12, power source 40 replies to the request by indicating that power transfer is supported. Power manager 36 then initiates power transfer as needed to operate information handling system 10. For example, if information handling system 10 is powered down, charge detector 38 detects the presence of cable 14 so that power manager 36 can initiate power transfer to charge battery 34. If adequate power is transferred from display 12 to operate information handling system 10, then power manager 36 supports normal operations with power transferred through power wire 46, otherwise, power manager 36 applies available power to charge battery 34, thus slowing battery discharge. In one embodiment, power manager 36 and display power source 40 exchange power parameters to use in management of the power transfer. For example, display 12 indicates the voltage and current available for transfer and power manager 36 indicates the voltage and current ranges at which power transfer is supported. The power parameters are used to arrange power transfer as desired.

Figure 2:
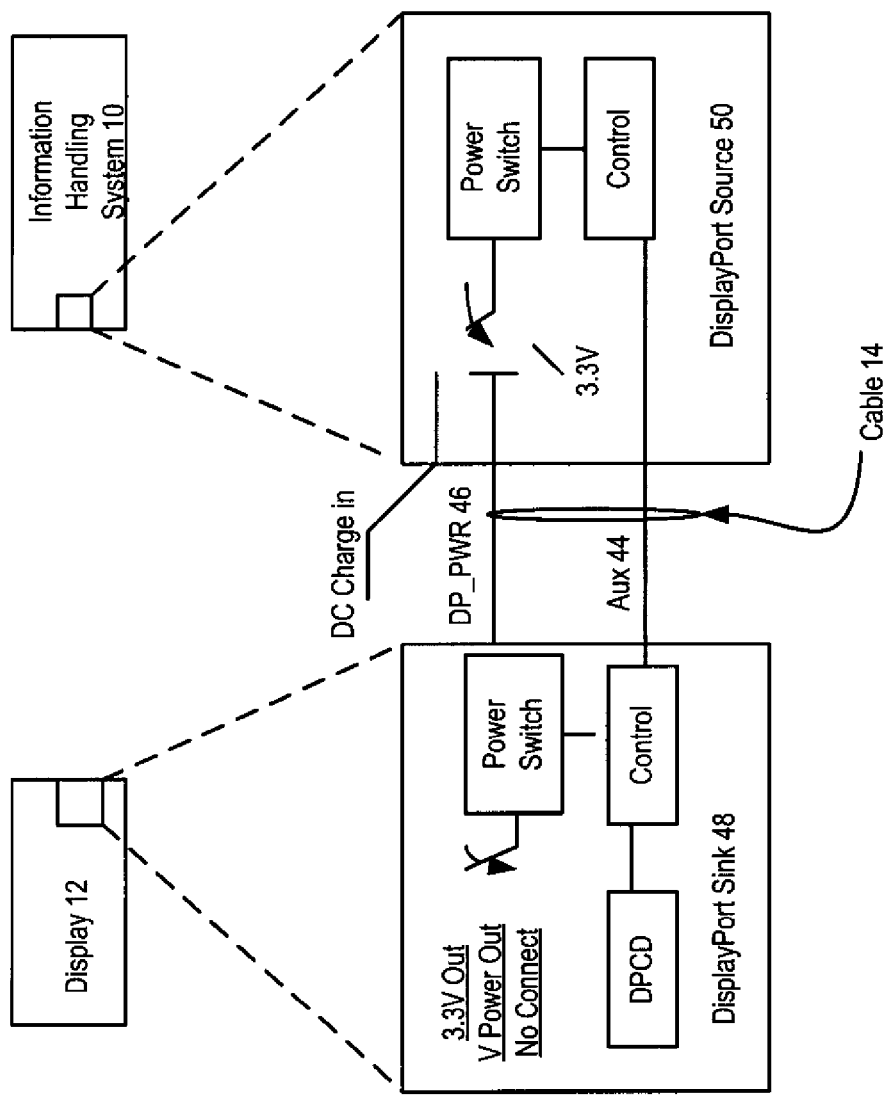
FIG. 2 depicts a circuit block diagram of a system for powering an information handling system from a display with power received through a display cable.

Referring now to FIG. 2, a circuit block diagram depicts a system for powering an information handling system 10 from a display 12 with power received through a display cable 14. Information handling system 10 is any type of processing system, such as a PDA, cell phone or portable information handling system, and display 12 is any type of display device, such as an LCD or plasma flat panel display or a projector. In the example embodiment of FIG. 2, a display sink 48 and information handling system source 50 communicate in accordance with the DisplayPort standard. Initially, information handling system source 50 is set up to provide 3.3V to display sink 48 through power wire 46 of cable 14 by interfacing power line 46 DP_PWR with a 3.3 Volt output source. Upon detection of sink 48 through cable 14, source 50 communicates through auxiliary channel 44 to check whether sink 48 has power source capability, such as with a DPCD read. If sink 48 has the ability to provide power, source 50 initiates a request to receive power and sink 48 acknowledges or denies the request. If the request is acknowledged, source 50 disconnects power wire 46 DP_PWR from the 3.3V source and changes the charge path to accept power. Sink device 48 disconnects power wire 46 DP_PWR from a position to accept 3.3V input to instead interface with VPower$_{out}$ to provide power to source 50. A power transfer initiates when source 50 indicates it is ready to accept power and source 48 is prepared to provide power. DP_PWR connections at sink 48 and source 50 remain open unless both sink 48 and source 50 indicate that power transfer is supported. In one embodiment, source 50 and sink 48 communicate power parameters through auxiliary channel 44 to determine the voltage and amperage of power transferred over power wire 46. For example, a 12 Volt battery at source 50 is trickle charged with an output from sink 48 of between 9 and 20 Volts.

Figure 3:
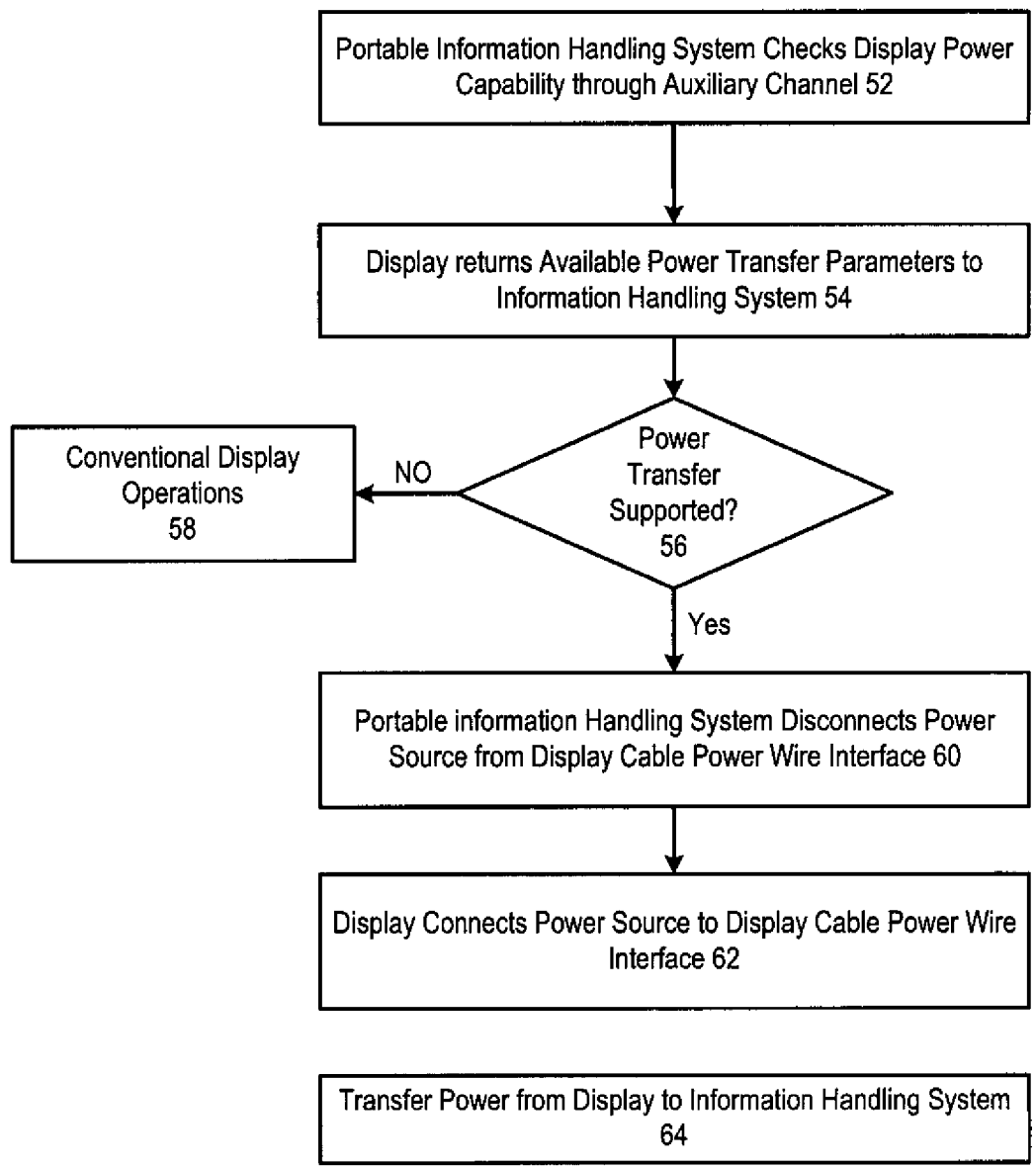
FIG. 3 depicts a flow diagram of a process for charging an information handling system battery with power received from a display.

Referring now to FIG. 3, a flow diagram depicts a process for charging an information handling system battery with power received from a display. The process begins at step 52 with the portable information handling system checking the display power capability with a communication through the auxiliary channel. In alternative embodiments, alternative communication paths may be used, such as a power or ground wire of the cable interfacing the information handling system and display. At step 54, the display returns available power transfer parameters and acknowledges the request for power transfer. At step 56, the information handling system determines if power transfer is available and desired. If not, the process continues to step 58 for conventional display operations. If yes, the process continues to step 60 where the portable information handling system disconnects a power source from the power wire of the display cable and configures the power wire to provide power from the display. At step 62, the display connects a power source to the display cable power wire to initiate power transfer from the display to the information handling system through the display cable. In an alternative embodiment, different amounts of power can be managed for transfer to or from information handling system 10. For example, rather than sending increased power from a display to an information handling system, the voltage and current sent from an information handling system is increased from the nominal 3.3V provided for under the DisplayPort standard to 12V or other voltage levels that might, for instance, power a graphics projector that receives power from an information handling system. In one embodiment, the power path from or to an information handling system depends upon power usage by the information handling system or display. For example, while a projector has an external power supply and an information handling system runs on a battery, power transfer occurs from the projector to the information handling system. If the projector loses external power supply, power transfer then can switch based upon an automated decision or a user input so that the power transfer occurs from the information handling system to the projector with a power level appropriate for running the projector, such as 12V.

Although the present invention has been described in detail, it should be understood that various changes, substitutions and alterations can be made hereto without departing from the spirit and scope of the invention as defined by the appended claims.

What is claimed is:

1. An information handling system comprising:
    a housing;
    plural processing components disposed in the housing that cooperate to process visual information;
    a battery disposed in the housing;
    a display interface port operable to accept a display cable and to communicate visual information through the display cable to a display and having a bidirectional auxiliary channel to communicate management information, the display interface port further operable to provide power to the display and receive power from the display; and
    a power manager running on a processing component, the power manager operable to request a battery charge from the display through the display cable auxiliary channel and to coordinate charging of the battery with power received at the display interface port through the display cable and from the display.

2. The information handling system of claim 1 wherein the power manager is further operable to receive power from the display cable at a selected of plural voltages.

3. The information handling system of claim 1 wherein the power manager is further operable to provide power to the display cable for use by the display at a selected of plural voltages.

4. The information handling system of claim 3 wherein the power manager receives power from the display cable at a first voltage and provides power to the display cable at a second voltage.

5. The information handling system of claim 4 wherein the first voltage comprises between nine and twenty Volts and the second voltage comprises approximately 3.3 Volts.

6. The information handling system of claim 1 wherein the power manager is further operable to coordinate charging of the battery with the processing components powered down.

7. The information handling system of claim 1 wherein the power manager further comprises a charge detector operable to detect a power source available at the display interface with the processing components powered down, the charge detector further operable to initiate coordinating of a battery charge with the power manager in response to detection of a power source.

8. The information handling system of claim 7 wherein the charge detector comprises a ground detector that detects a cable interface.

9. The information handling system of claim 1 further comprising:
    a display cable having a power line; and
    a display interfaced with the display interface port by the display cable, the display comprising a power source operable to receive a battery charge request from the power manager and to provide a charge to the display cable power line in response to the charge request.

10. A method for providing power to an information handling system from a display through a display cable, the method comprising:
    providing power from the information handling system to the display through the display cable;
    communicating a power request from the information handling system to the display through the display cable;
    communicating a power request acknowledgment from the display to the information handling system through the display cable;
    applying power at the display to a power wire of the display cable; and
    receiving the power at the information handling system through the power wire.

11. The method of claim 10 wherein communicating a power request further comprises communicating the power request through a bidirectional auxiliary channel of the display cable.

12. The method of claim 10 wherein receiving the power at the information handling system further comprises applying the power to charge a battery.

13. The method of claim 10 wherein communicating a power request further comprises communicating power parameters of the information handling system to the display.

14. The method of claim 10 wherein communicating a power request acknowledgment further comprises communicating power parameters of the display to the information handling system.

15. The method of claim 14 wherein the power parameters comprise a voltage provided from the display.

16. The method of claim 10 further comprising:
powering down the information handling system;
detecting at the information handling system a power source available through the display cable; and
powering up at the information handling system components sufficient to coordinate a charge of a battery at the information handling system.

17. A system for providing power to an information handling system from a display, the system comprising:
a display cable having an integrated power line;
a graphics system integrated in the information handling system and operable to send graphics information through the display cable for presentation at the display;
a power manager running on a processor of the information handling system and operable to request power from the display with the information handling system powered down and having a battery with less than a full charge, receive confirmation of power available from the display, and in response to the confirmation to apply the power received from the display to the battery of the information handling system; and
a power source integrated in the display and operable to respond to the power manager request for power and to provide power from display to the information handling system through the display cable power line at predetermined power parameters.

18. The system of claim 17 wherein the power manager and power source communicate the power parameters through the display cable.

19. The system of claim 17 wherein the display cable comprises a bidirectional auxiliary channel, the power manager requesting power through the auxiliary channel.

* * * * *